United States Patent [19]

Parrish, Jr. et al.

[11] 4,442,530
[45] Apr. 10, 1984

[54] DIGITAL TRANSMITTER WITH VECTOR COMPONENT ADDRESSING

[75] Inventors: Henry H. Parrish, Jr., Miami Springs; Rangarajan Srinivasagopalan, Miami, both of Fla.

[73] Assignee: Racal Data Communications Inc., Miami, Fla.

[21] Appl. No.: 304,018

[22] Filed: Sep. 21, 1981

[51] Int. Cl.³ .......................................... H04L 27/20
[52] U.S. Cl. ........................................ 375/67; 375/53; 332/9 R
[58] Field of Search ................... 375/53, 67; 332/9 R, 332/16 R, 11; 370/70; 364/200 MS File, 900 MS File; 328/14

[56] References Cited

U.S. PATENT DOCUMENTS

| | | | |
|---|---|---|---|
| 3,747,024 | 7/1973 | Choquet et al. | 375/67 |
| 3,909,721 | 9/1975 | Bussgang et al. | 375/67 |
| 3,935,386 | 1/1976 | Glasson et al. | 375/53 |
| 3,987,374 | 10/1976 | Jones, Jr. | 375/67 |
| 3,988,540 | 10/1976 | Scott et al. | 375/53 |
| 4,003,001 | 1/1977 | Jones, Jr. | 375/67 |
| 4,008,373 | 2/1977 | Nash et al. | 375/53 |
| 4,263,670 | 4/1981 | Sherman | 375/67 |
| 4,307,464 | 12/1981 | Hughes | 375/67 |

OTHER PUBLICATIONS

Choquet, Nussbaumer, "Generation of Synchronous Data Transmission Signals by Digital Echo Modulation," Sep. 1971.

Croisier, Pierret, "The Digital Echo Modulation," Aug., 1970.

Primary Examiner—Robert L. Griffin
Assistant Examiner—Stephen Chin
Attorney, Agent, or Firm—Jackson, Jones & Price

[57] ABSTRACT

A digital transmitter wherein a read only memory (ROM) is addressed by subaddresses representing vector components of signal point positions of a desired transmit spectrum. In this manner, greatly reduced ROM storage requirements are achieved.

11 Claims, 8 Drawing Figures

DIGITAL TRANSMITTER WITH VECTOR COMPONENT ADDRESSING

BACKGROUND OF THE INVENTION

The subject invention relates to digital modulation and is an improvement upon the invention of Scott et al U.S. Pat. No. 3,988,540. According to the Scott et al patent, samples of a data modulated carrier are stored as digital numbers in a memory device. Input data signals are coded into proper address signals for addressing this memory during each modulation period to produce a modulated output signal. Particularly, the address of Scott et al for amplitude and phase modulation is in $(r,\theta)$ (polar coordinate)form. As taught by Scott et al, two identical memories (ROMS) are used for a four phase-two amplitude scheme.

The Scott et al technique has proven in practice to be well-adapted to generation of various phase and phase-amplitude modulated signal structures. However, extension of the Scott et al approach to a 64 point signal structure, a very large constellation in the state of the art, requires storage of such a large number of quantities to such a degree of accuracy as would tax current VLSI and ROM storage technology. As a practical matter, the complexity involved renders it undesirable to extend the Scott et al structure to a 64 point structure.

SUMMARY OF THE INVENTION

It is therefore an object of the invention to provide an improved digital modulator;

It is a further object of the invention to provide a simplified method for generating signal structures having a large number of points.

According to the invention, it has been discovered that the large memory storage requirements necessitated, for example, by a large signal point structure can be greatly simplified by resolution of the addressing mechanism into component parts. Greatly reduced storage requirements result by employing successive accessing of a memory by each component to generate particular signal points. In the preferred embodiment, a typical polar $(r,\theta)$ address is resolved into rectangular $(x,y)$ components.

BRIEF DESCRIPTION OF THE DRAWINGS

The preferred embodiment of the invention will now be described in detail in conjunction with the drawings of which.

DETAILED DESCRIPTION ON THE PREFERRED EMBODIMENT

The Scott et al patent describes a basic technique for digitally synthesizing a transmitter output. The Scott et al technique conceptualizes the transmitter output as a composite of a number of impulse response waveforms occurring at the symbol interval, as shown in FIG. 1.

Figure 1:
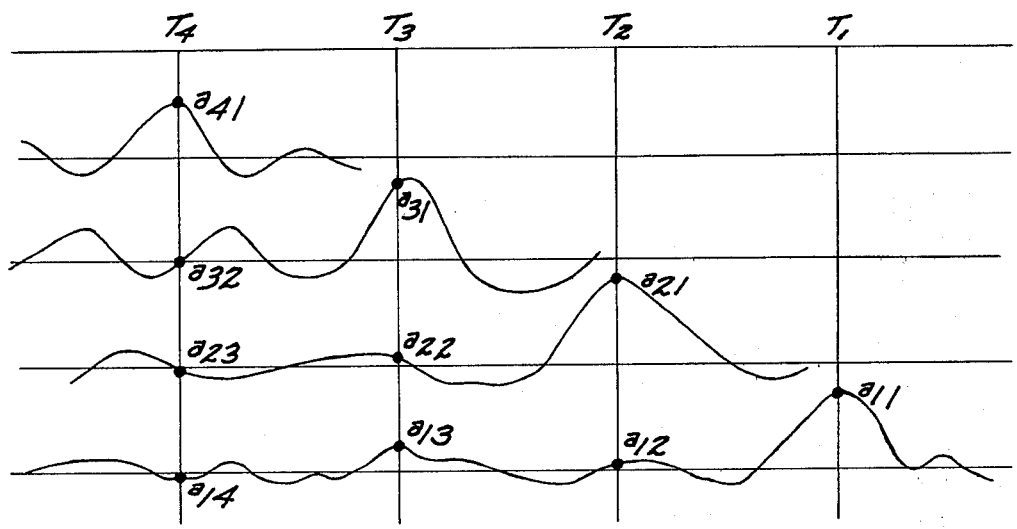
FIG. 1 depicts a plurality of waveforms.

In FIG. 1, each line $\theta_1,\theta_2,\theta_3,\theta_4$ represents the transmitter impulse response accorded to a particular phase shift of a carrier. At any one instant $T_1, T_2, T_3, T_4 \ldots$, the value utilized to generate the transmitter waveform is the sum of the particular values of the waveform at that instant. Thus, to generate a particular transmitted spectrum, Scott et al teaches that appropriate numerical values can be stored, addressed, summed together and converted to an analog output spectrum.

For example, looking at FIG. 1, if the phase to be transmitted at time $T_1$ is of a certain value $\theta_1$, then at time $T_1$ a value $a_{11}$ is generated. If the next symbol at $T_2$ is to have a phase of $\theta_2$, then the amplitude $a_{21}$ is generated. But now the affect of the first symbol generated must also be considered so that amplitude $a_{12}$ must be added to amplitude $a_{21}$. Then at $T_3$, $\theta_3$ we must add $a_{31}+a_{22}+a_{13}$. Finally at $(T_4, \theta_4)$ we add $a_{41}+a_{32}+a_{23}+a_{14}$. For $(T_5, \theta_5)$ and each $(T_n, \theta_n)$ thereafter we add four amplitudes. Thus, if a ROM is successively addressed by $(T_n, \theta_1)$, $(T_n, \theta_2)$, $(T_n, \theta_3)$ and $(T_n, \theta_4)$ at time $T_n$ the ROM can be made to generate four predetermined values which can be added to give the correct amplitude value. This value is supplied to a digital to analog converter to generate the output signal. Of course, in normal four phase operation, each symbol interval (modulation period) would entail adding four quantities.

Figure 2:
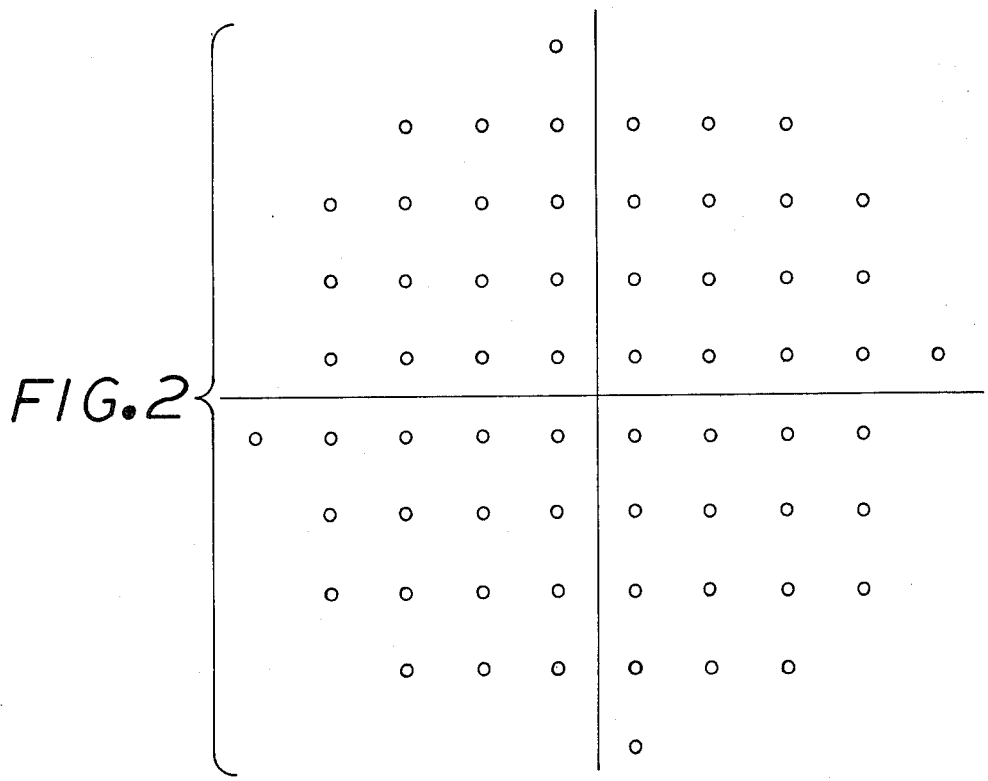
FIG. 2 depicts a 64 point signal structure as produced by the preferred embodiment of the invention.

In a system having both amplitude and phase changes, impulse responses of varying heights must be used. Hence, a ROM must be addressed by successive addresses each having amplitude and angle information during a given symbol to give the correct series of ROM output values to create the transmitted spectrum. The Scott et al technique can be and has been straightforwardly extended to such phase and angle cases, for example, such as 4 phase, 2 amplitude. However, when a transmitted spectrum of a size such as that shown in FIG. 2 is considered, i.e. a 64 point pattern for a 2400 baud, 14400 bit per second data rate, extension of the Scott et al technique becomes less than desirable. In such case, it has also been found that a spread of 16 symbols (rather than 4 as shown in FIG. 1) is desirable, and thus 16 output values are summed per symbol time rather than the 4 shown. As shown below, the large amount of storage required according to a straightforward extension of Scott et al to the signal structure of FIG. 2 is practically undesirable and would tax current storage technology.

To illustrate, if the Scott et al system were to be used to transmit the 64-point signal structure shown in FIG. 2, nine different magnitudes must be stored with relative ratios of 1.000, 2.236, 3.000, 3.606, 4.123, 5.000, 5.385, 6.082, and 6.403 at angles of 45.00°, 18.43°, 45.00°, 11.31°, 30.96°, 8.130°, 23.20°, 35.54°, and 6.340°, respectively with each of the angles rotated by 0°, 90°, 180°, and −90°, having an accuracy closer to the ideal angle than $\frac{1}{2}$°. Mathematically, the resulting line waveform $e(nT_s)$ is, $$e^{(nT_s)} = \sum_k Re[r_{n-k}\exp(j\theta_{n-k})\exp(jn\omega_c T_s)]$$

$$= \sum_k [X_{n-k}\cos(n\omega_c T_s) - y_{n-k}(\sin[n\omega_c T_s])]$$

n is a running index 1, 2, 3 . . . .
k varies over the number of coefficients in the digital filtering function
exp indicates exponentiation of e=2.71828
j is the indicated square root of −1
$T_B$ is the symbol interval
$T_s$ is the sampling instant and in the disclosed embodiment occurs at four times the rate of $T_B$
x and y respectively equal the real and imaginary part of the baseband waveform
$\theta=\tan^{-1}(y/x)$ is the argument of the baseband waveform $r=(x^2+y^2)^{\frac{1}{2}}$ is the baseband waveform magnitude
$\omega_c=2\pi$ fc is the carrier frequency in radians per second
According to the Scott et al technique, the nine different radii and the angles mentioned are required because the entire expression for each of sixteen intervals to produce $e(nT_s)$ would be produced by sixteen successive $(r,\theta)$ addresses to ROM. The present invention, on the other hand, resolves the signal into each of its components parts, first producing $x_{n-k}\cos(n\omega_c T_s)$ and then $y_{n-k}\cos(n\omega_c T_s+\pi/2)$ requiring only storage of the ratios 1,3,5,7, and 9 to serve for both x and y with $\theta=0°$ for each of the five magnitudes. For 2400 baud and 1700 Hz carrier, storage of these magnitudes at the 24 integer multiples of 15° is sufficient. For a D/A output rate of 9600 per second, and a spread of 16 symbols, $$e_{n+j/4} = \sum_{i=0}^{15} x_{15-i+j/4}\cos\theta_{n+i} + y_{15-i+j/4}\cos(\theta_{n+i}+90°)$$

j=0,1,2,3
The hardware functions necessary are (a) add twice as fast, (b) multiplex between first x, then y, and (c) when y is selected, add 90° to $\theta_{n+i}$. Thus, a relatively simple method of dramatically reducing memory complexity and producing a 64 point signal spectrum is disclosed.

Figure 3:
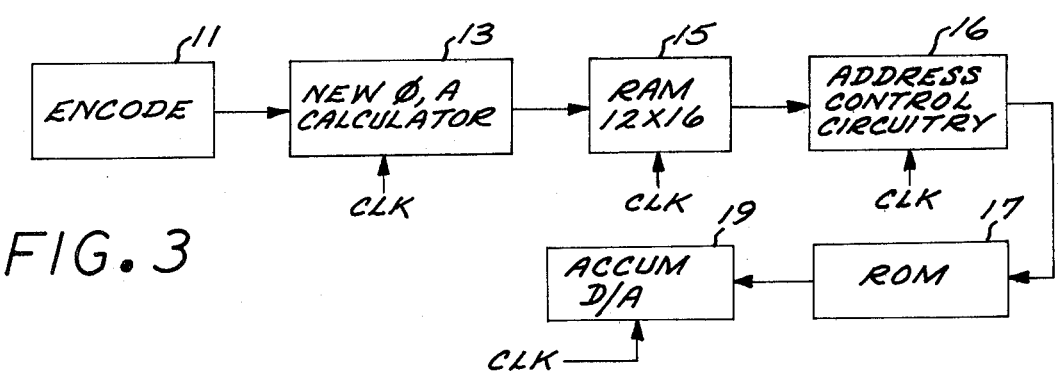
FIG. 3 is a block diagram of a modulator according to the preferred embodiment.

The basic modulator structure of the preferred embodiment is shown in FIG. 3. FIG. 3 illustrates an encoder 11 which receives and encodes digital data each symbol and configures successive addresses for storage in a RAM 15. The transmitter's RAM 15 stores a 12 bit word for each of sixteen symbols, each word having $\theta$, x, y, and SCE bits.

The SCE bit is a useful control bit which is shown for the sake of completeness but is not essential to the invention. The transmitter is squelched if SCE is zero for all 16 symbols. If SCE is high for all 16 symbols, then normal data transmission occurs.

The addresses stored in the RAM 15 are operated upon by the address control logic 16 and presented to the ROM 17 in a manner hereinafter described. The outputs of the ROM 17 are fed to an accumulator and digital to analog converter 19 which produce the line signal as more particularly described hereafter. The following discussion is particularly directed to the technique of the invention described above for implementing a 64 point signal structure with the basic building blocks of FIG. 3.

The basic operation of the apparatus of FIG. 3 may be appreciated by reference to equations 1 to 5. Equations 1-6 show the output of the D/A during each composite sample 0 through 3 of symbol 0 and composite sample 0 of symbol 1. In equations 1-6, the variable S includes the angle and SCE, while (x,y) represent magnitude.

$$O_{0,0} = S_{15}x_0 + S'_{15}y_0 + S_{14}x_4 + S'_{14}y_4 + S_{13}x_8 + \quad (1)$$
$$S'_{13}y_8 + \ldots S_2x_{52} + S'_2y_{52} + S_1x_{56} + S'_1y_{56} + S_0x_{60} + S'_0y_{60}$$

$$O_{0,1} = S_{15}x_1 + S'_{15}y_1 + S_{14}x_5 + S'_{14}y_5 + \ldots + \quad (2)$$
$$S_1x_{57} + S'_1y_{57} + S_0x_{61} + S'_0y_{61}$$

$$O_{0,2} = S_{15}x_2 + S'_{15}y_2 + S_{14}x_6 + S'_{14}y_6 + \ldots + \quad (3)$$
$$S_1x_{58} + S'_1y_{58} + S_0x_{62} + S'_0y_{62}$$

$$O_{0,3} = S_{15}x_3 + S'_{15}y_3 + S_{14}x_7 + S'_{14}y_7 + \ldots + \quad (4)$$
$$S_1x_{59} + S'_1y_{59} + S_0x_{63} + S'_0y_{63}$$

$$O_{1,0} = S_{15}x_4 + S'_{15}y_4 + S_{14}x_8 + S'_{14}y_8 + \ldots + \quad (5)$$
$$S_1x_{60} + S'_1y_{60} + S_{16}x_0 + S'_{16}y_0$$

$$O_{I,J} = \sum_{i=0}^{15}(S_{I+i}X_{60-4i+J} + S'_{I+i}Y_{60-4i+J}) \quad (6)$$

for $I = 0 \ldots N$
$J = 0 \ldots 3$

For example, $S_{15}x_0$ is the result of addressing the ROM 17 with a first address from RAM. This first address is then operated upon by the address control circuitry to produce a new address which causes $S'_{15}y_0$ to be read out. Adding $S_{15}x_0$ and $S'_{15}y_0$ gives a resultant vector having the desired magnitude and phase of one of the 16 component samples which form the desired samples. $S_{14}x_4+S'_{14}y_4$ and the other $Sx+S'y$ pairs are formed in the same fashion. By the end of summation by the accumulator, 16 pairs of $Sx+S'y$ have been summed to form a composite sample for the D/A converter. Four such composite samples are formed each symbol interval. It may be noted that the term "composite sample" used herein refers to a sample of the desired output waveform, which is a composite of a number of samples of individual waveforms, for example, such as sample $a_{21}$ of waveform $\theta_4$ shown in FIG. 1. The quantities such as $S_x$ or $S'_y$ are subcomponents or "subsamples" of a sample such as $a_{21}$.

No new $\theta$ value is used until $O_{10}$, the first composite sample of the second symbol. However, the apparatus must still account for the carrier change from one composite sample to the next. This is accomplished by appropriately computing the values stored in ROM. For example, $x_1$ as computed for storage in ROM is rotated $\frac{1}{4}$ of (255°) from $X_0$, $x_2$ by $\frac{1}{2}$ of (255°), $x_3$ by $\frac{3}{4}$ of (255°) etc.

Figure 4:
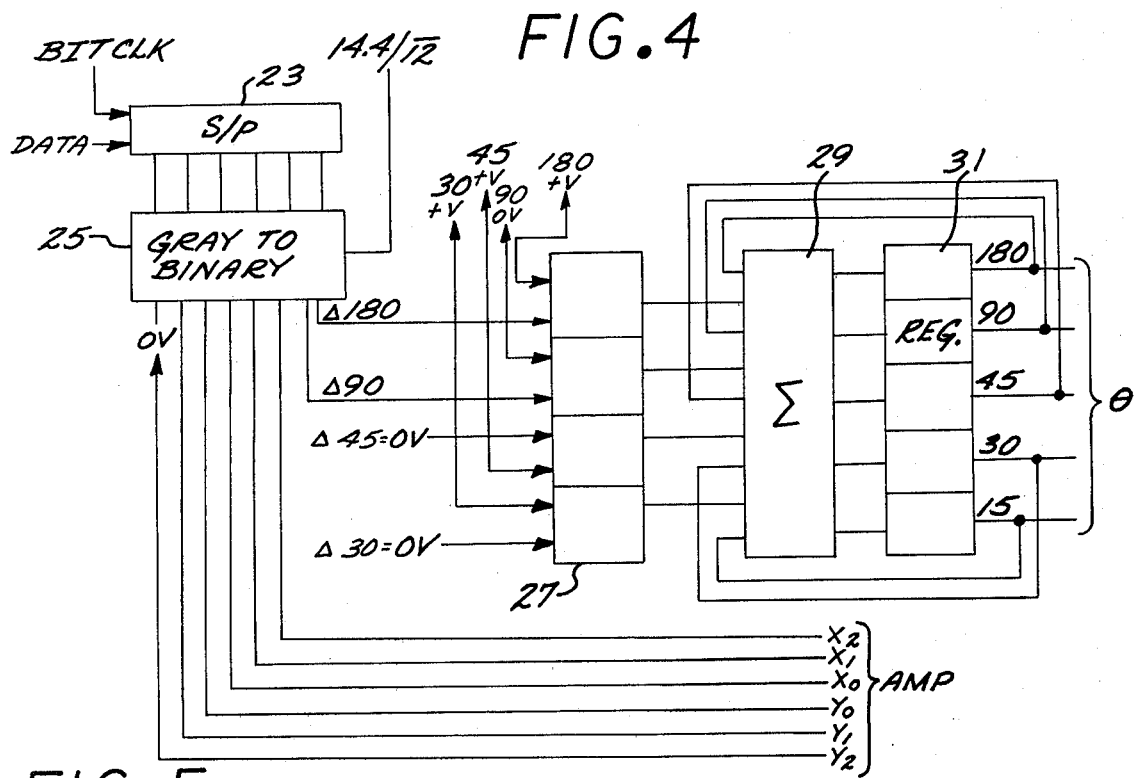
FIG. 4 is a schematic of encoder and new phase and amplitude calculator circuitry.

FIG. 4 shows the input portion of the modulator/transmitter of the preferred embodiment of the subject invention. This portion performs the functions of the encoder 11 and the new phase and amplitude calculator 13 shown in FIG. 3.

The circuitry of FIG. 4 provides addresses for storage in the RAM 15. Each address includes a 5 bit angle indicator, a 3 bit "x" indication and 3 bit "y" indication. In FIG. 4, digital data is clocked into a serial to parallel converter 23 by a bit clock at a rate of 14,400 bits per second (6 times 2400). Six bits are read out in parallel each symbol through a Gray to binary encoder 25. The outputs include a differential angle indicator D$\theta$ and a magnitude indicator with three bits for x, three for y, the most significant bit (MSB) of y always being zero. The MSB of y is zero because y only takes on values 0,1,2,3, while x take on 0,1,2,3, and 4 in the first quadrant of the exemplary structure of FIG. 2.

A first summer 27 adds 180°, +45°, and +30° to the differential angle $D\theta$. The sum of these angles is 255°, the amount by which the carrier changes from one symbol to the next. Adding 255° to $D\theta$ gives the total or absolute phase change which appears at the output of the first summer 27. This is the total amount by which the phase at the center of one symbol will be shifted from the phase at the center of the previous symbol.

The angle value of the output of the first summer 27 is inputted to an accumulator shown as a summer 29 and a register 31. The output of the register 31 is the old phase position. This phase position is represented by bits for 15°, 30°, 45°, 90° and 180°. In the embodiment under discussion, the logic is such that 30° and 15° are never activated at the same time. In the situation where this would occur, the logic causes the 45° line to be high and both 30° and 15° to be low.

The second summer 29 adds the old absolute phase position at the output of the register 31 to the output of the first summer 27 to give the new absolute phase position, which is clocked into the register 31 for the newly started symbol. Thus, each symbol, 12 bits, representing 3 bits of x amplitude information, 3 bits of y amplitude information, 5 bits of angle information and an SCE bit are read into the RAM storage locations illustrated in FIG. 5.

Figure 5:
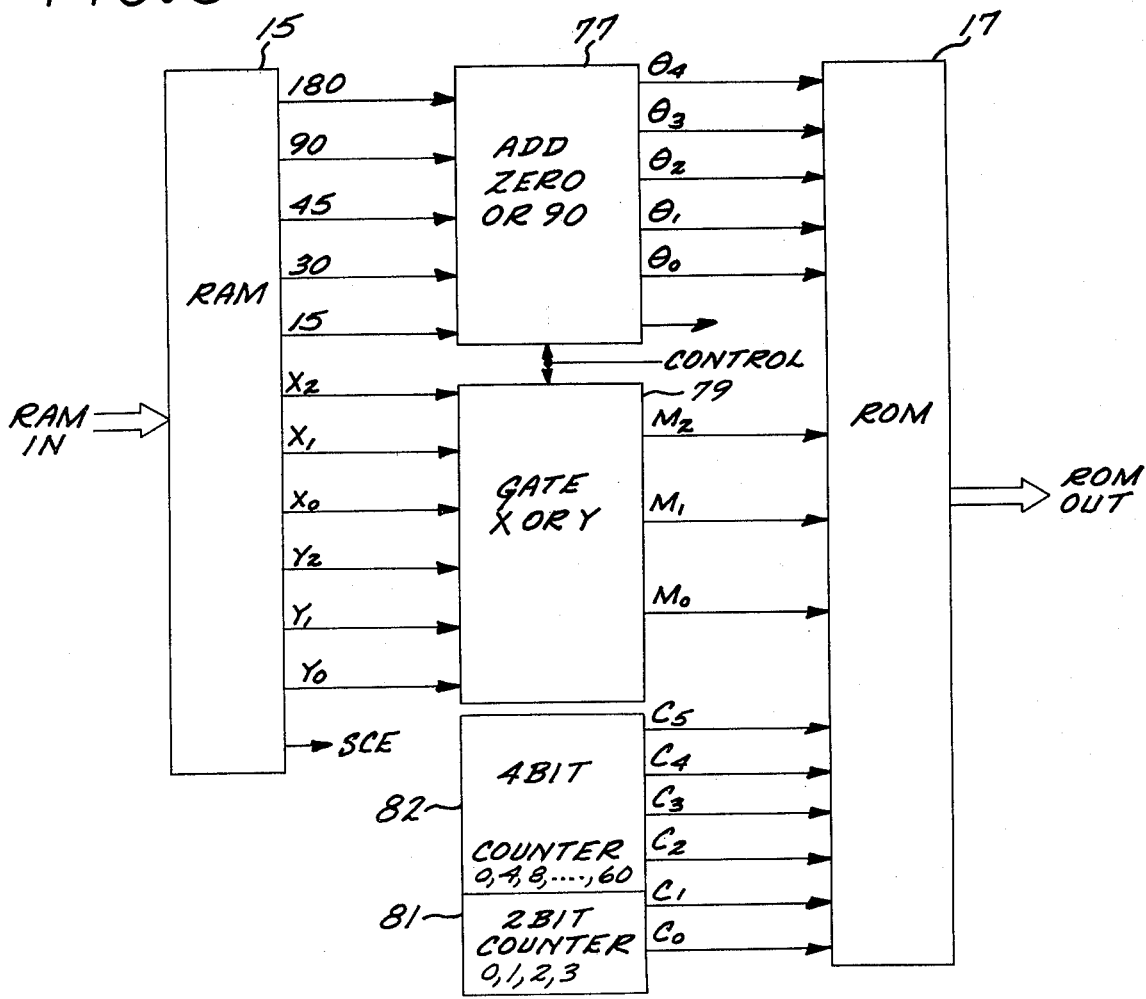
FIG. 5 illustrates address control circuitry according to the preferred embodiment of the invention.

FIG. 5 shows the circuitry used according to the invention to control addressing of the ROM 17 from the RAM 15. As before noted, the RAM 15 contains 5 bits of angle information, 3 bits of x magnitude information, 3 bits of y magnitude information and an SCE bit for each of 16 symbols. The address control circuitry is shown functionally as including an adder 77, and a gate 79. Additional address bits are provided by a 4-bit address counter 82 and a 2-bit address counter 81.

The address counters 81 and 82 are arranged to produce counts which correspond to the subscripts of the x and y values in equations 1–6. Thus, during production of the first composite sample $0_{00}$, the $C_1$ and $C_0$ bits are both "0" or low. The bits $C_2$ through $C_5$ of counter 82 increment successively causing counts and hence addresses of 0, 4, 8, 12, 16 . . . 60 to be produced. These correspond to the subscripts of the x,y values during the first composite sample, as shown in equation 1, i.e. $x_0$, $y_0$; $x_4y_4$; $x_8y_8$ . . . $x_{60}y_{60}$. During the second composite sample $0_{01}$, the $C_0$, $C_1$ bits of counter 81 have the value 1, causing each address to move over 1 from that selected during the first composite sample. Thus, during the second composite sample, successive incrementation of counter 82 with counter 81's output fixed at 01 gives 1, 5, 9, 13 . . . 61, again corresponding to the subscripts of x and y in equation 2. Of course, this addressing scheme dictates the location in memory of the values to be addressed, as known to those skilled in the art.

In operation, to produce a pair $S_ix + S'_iy$, the RAM angle address $\theta_{15} \ldots \theta_{90}$ is first passed directly to the ROM 17. Per FIG. 6, the $\theta_{180}$ bit is passed to complementer 69. The complementer 69 complements the output of ROM 17 if $\theta_{180}$ is true. In this manner, the number of angles which have to be stored by the ROM 17 is effectively halved, from 24 to 12, as taught by Scott et al.

Referring to FIG. 5, at the same time $\theta_{15} \ldots \theta_{90}$ is applied to the ROM 17, the x magnitude bits are also gated by gate 79 to the ROM address inputs. The result is that the output of the ROM produces $S_ix$ after operation of the complementer. On the next increment of the clock, a control line to the adder 77 and the gate 79 is activated. This causes the angle address to the ROM to be incremented by 90°. It also causes the y mangitude bits $y_0$, $y_1$, $y_2$ to be gated to the ROM address inputs in place of $x_0$, $x_1$, $x_2$. The timing address provided by the counters 81 and 82 remains the same. The resulting output after the complementer is $S'_iy$.

Upon the next increment of counter 82, a new address is made available at the RAM 15 output, and the gate 79 and adder 77 are returned to their original "gate x" and "add zero" positions. A new $S_ix$ value is read out of the ROM 17. Then the counter 82 increments, gate 79 and adder 77 respectively gate y and add 90°, and a new $S'_iy$ is produced. This process repeats until counter 82 has counted 16 times. At this point all quantities for formation of one D/A composite sample have been read out of the ROM. The consecutive outputs are added as they appear according to the equations 1 to 6 by circuitry shown in FIG. 6. As shown in FIG. 5, a burst of 16 outputs from the RAM 15 are produced at a 302.4 KHz rate in the preferred embodiment. The control line is clocked at 604.8 KHz to control the gate 79 and adder 77. The counter 82 is clocked at the 302.4 KHz rate while the counter 81 is clocked at 9.6 KHz.

Figure 6:
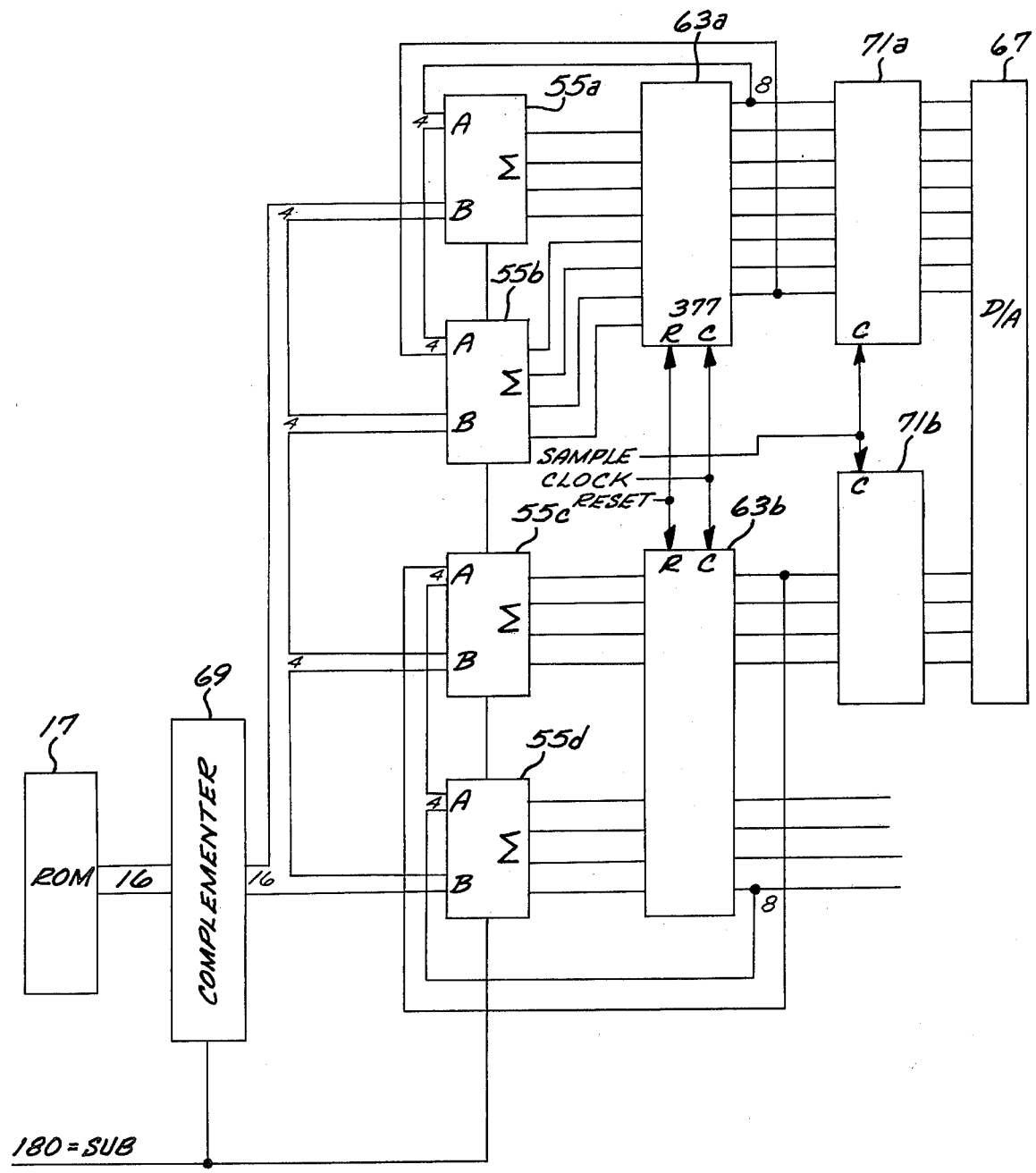
FIG. 6 is a schematic of accumulator and digital to analog conversion circuitry according to the preferred embodiment.

FIG. 6 illustrates details of the circuitry at the output of the ROM 17. This circuitry includes a sixteen bit full adder 55a–d, a sixteen bit register 63a,b, a D/A input storage register 71 and a D to A converter 67. The full adder 55 and register 63 form a 16-bit accumulator.

As shown, the output of the ROM 17 first goes to the complementer 69. The complementer 69 outputs the 16 bits to full adder 55. If the complementer 69 complements, it must also add an LSB to the lower most adder 55d to produce the two's complement of the ROM output. The full adder 55 then adds the contents of the register 63 to the output of the complementer 69.

D/A 67 is a twelve bit off-shelf part using the 12 MSB's of the register 63 outputs. A new sample from register 63 is transferred to the D/A input storage register 71 at a rate of 9600 samples per second, or four times per symbol. After transfer, register 63 is cleared to zero. The new ($\theta$,x,y,SCE) is written into RAM once per symbol. In operation, successive $S_ix_0$ is added to $S'_iy_0$, which is then added to $S_{i+1}x_4$ which is then added to $S'_{i+1}y_4$ etc.

Figure 7:
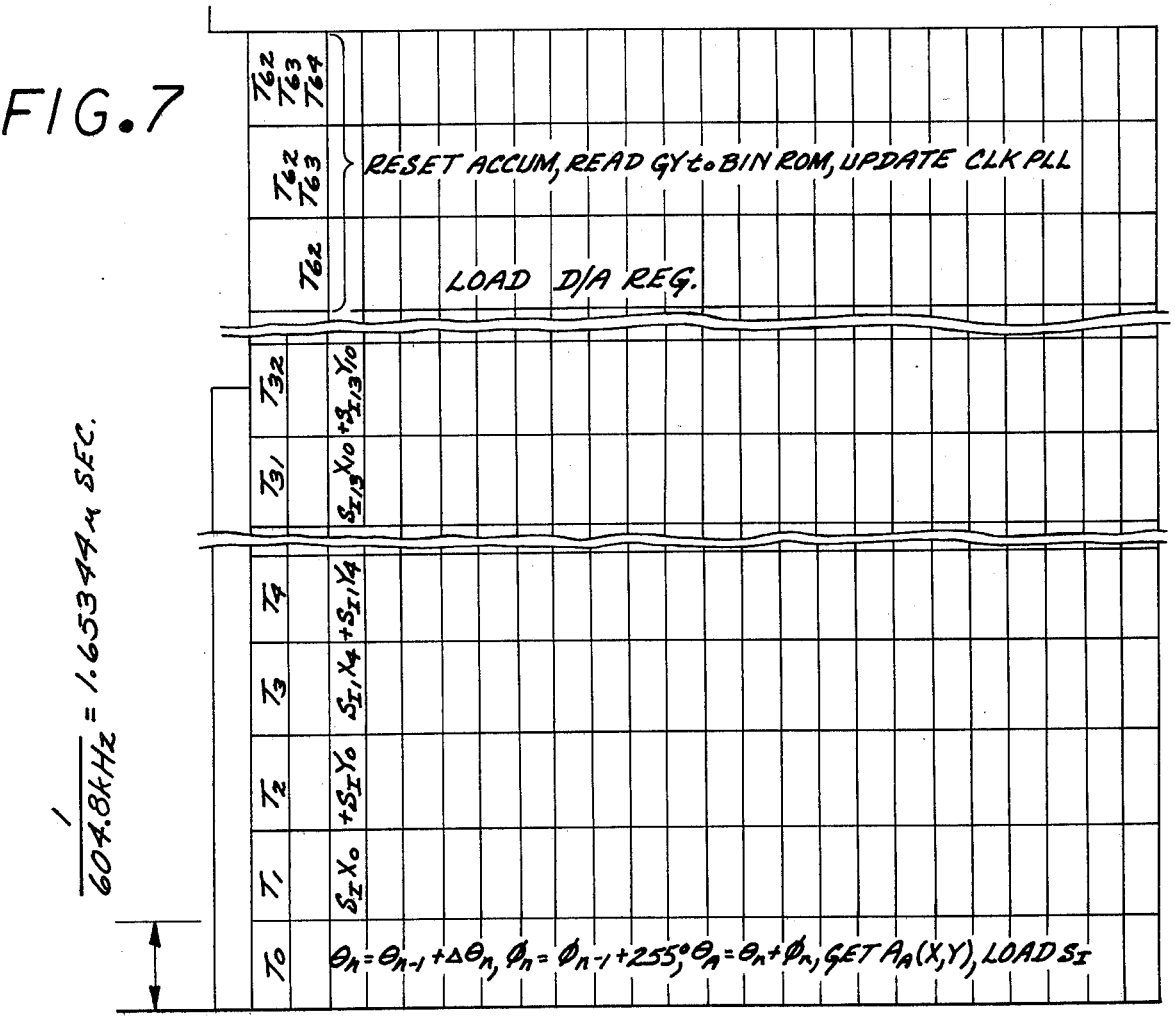
FIG. 7 illustrates timing in the preferred embodiment.

The overall timing scheme of the system is illustrated in FIG. 7. As shown, there are 63 intervals of 1.65 micro seconds scheduled for each composite sample, and 4 composite samples per symbol. Because of add/delete circuitry used in phase locking, there may be as few as 62 or as many as 64 intervals available. Therefore, timing is arranged to assume all operations are completed by interval 62.

At $t_0$, new $D\theta$ is calculated and the carrier change is added to give $\theta_a$ (theta absolute). $\theta_a$ and the amplitude information (x,y) are loaded into the RAM 15. The next intervals consist of outputting the values Sx, S'y and forming a running sum thereof. Then the D/A register 71 is loaded. The last steps which must be performed are reset accumulator, read ROM and update the clock phase lock loop.

Figure 8:
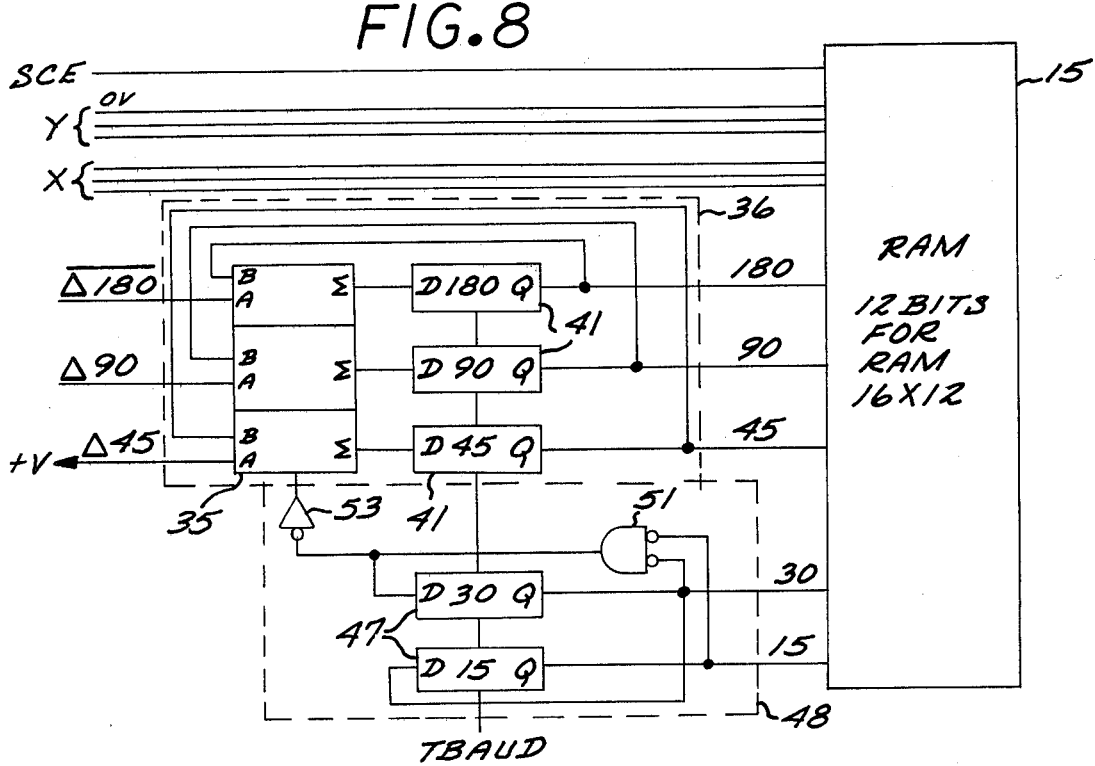
FIG. 8 is more detailed schematic of the new phase and amplitude calculator logic.

FIG. 8 shows a more detailed schematic of a circuit for adding 255°+$D\theta$ in an actual machine. This circuit essentially performs the function of both adders 27 and 29 shown in FIG. 4 and is preferably embodied as a three-bit accumulator (36) and a divide-by-three counter 48. The 12 bit output of this circuit addresses the 16×12 RAM 15. The SCE bit (soft carrier enable) is stored along with each symbol in the transmitter. As before noted, if the SCE bit is a "1", it means the symbol will be transmitted. If it is zero, the corresponding symbol will not be transmitted.

In FIG. 8 adder 35 registers 41 and 47, and logic gates 51,53 are shown. A 180° is fed to a first adder 35. To account for the carrier change each symbol, it is desired to add 180°, 45°, and 30°. First adding 180° to D180° simply inverts the quantity giving $\overline{\text{D180}}$. Hence, the D180 bit is stored in ROM 25 in inverted form to give 180° of the carrier change. The 45° bit is always added and hence its input to the adder 35 is simply tied to a logic ONE. The D90 bit is presented to the adder 35 unchanged since it requires no modification to account for the carrier change. Thus, formation of 225° of the 255° has been accomplished by adding 180° and 45°, leaving another 30° to be added.

The additional 30° is accounted for by the register 47, the Nor gate 51 and the inverter 53. When the 30° output is low, and the 15° output is low, the Nor gate 53 output is high. This output is inverted by inverter 53. The output of the inverter 53 inhibits addition of D45 if the 30° and 15° outputs are both low. In all other cases there is a carry into the 45° position. When all registers 41 and 47 are clocked in parallel by the symbol clock the upper register 41 reads the outputs of the adder and changes accordingly. The lower register 47 shifts to the next state and keeps track of where the least significant bits of the carrier are.

As alluded to, implementation of the preferred embodiment just described results in reduced storage requirements for the ROM 17. The amount of storage required for the ROM 17 is as follows. Using 4 composite samples per symbol × 16 symbols requires 64 samples stored as five different amplitudes in the ratio of 1,3,5,7,9 for the particular 64 point signal constellation described. The carrier change is an integer multiple of 15°/symbol. Therefore, the ROM must store symbols in increments of 15°(17°×15°=255°). For a full circle there are 24 increments of 15°. However, as described earlier, it is only necessary to store the first half of these increments and complement for angles greater than 180°. Hence, although there are 24 angles, the ROM 17 only need store 12. This results in total necessary storage capacity of 3840 16-bit words. The nearest binary multiple to 3840 is 4096. Thus, two standard 32 kilobit ROMS each having a storage capacity of 4 K×8-bits are used to give 64K total bit storage.

As may be appreciated the method and apparatus of the preferred embodiment of the invention may find many applications aside from the embodiment particularly described herein. Thus, it is to be understood that, within the scope of the appended claims, the invention may be practiced other than specifically described herein.

What is claimed is:

1. A method of utilizing a first memory in a transmitter wherein said first memory stores values to be addressed and operated upon to construct a composite waveform for transmission by said transmitter comprising the steps of:
    addressing said first memory with a first address including a first vector component subaddress and an angle subaddress to produce a first output from said first memory;
    addressing said first memory with a second address including a second vector component subaddress and a modified subaddress formed as a mathematical function of said angle subaddress to produce a second output from said first memory; and
    utilizing said first and second outputs in formation of said composite waveform.

2. The method of claim 1 wherein said vector components comprise first and second rectangular components.

3. The method of claim 1 or 2 wherein said modified subaddress formed as a mathematical function of said angle subaddress is formed by adding 90° to said angle subaddress.

4. In a transmitter, apparatus comprising:
    a first memory means for storing values to be addressed and operated upon to construct a composite waveform for transmission by said transmitter;
    a second memory means for storing a plurality of addresses each including first and second vector component subaddresses and an angle subaddress;
    means for forming a modified subaddress as a mathematical function of said angle subaddress;
    means for addressing said first memory with a first address including said first vector component subaddress and said angle subaddress to produce a first output from said first memory and with a second address including said second vector component subaddress and said modified subaddress to produce a second output from said first memory; and
    means for utilizing said first and second outputs in formation of said composite waveform.

5. The apparatus of claim 4 wherein said vector components comprise first and second rectangular components.

6. The apparatus of claim 4 or 5 wherein said means for forming a modified subaddress forms said modified subaddress by adding 90° to said angle subaddress.

7. In a digital data transmitter, the apparatus comprising:
    a random access memory addressable to provide a plurality of address bits, including an angle address, a first Cartesian coordinate address and a second Cartesian coordinate address;
    means for addressing said random access memory;
    a read-only memory addressable to produce a plurality of subsamples, pairs of which are to be added to constitute a complete sample of a desired waveform;
    means for adding zero or ninety degrees to said plurality of angle address bits and applying the resulting quantity as an address to said read-only memory;
    means for gating said first Cartesian coordinate address to address said read-only memory substantially simultaneously with presenting the angle address to which zero degrees has been added and for gating said second Cartesian coordinate address to address said read-only memory substantially simultaneously with the angle to which ninety degrees has been added; and
    means for applying a plurality of timing address bits to said read-only memory.

8. A method of utilizing a first memory in a transmitter wherein said first memory stores values to be addressed and operated upon to construct a composite waveform for transmission by said transmitter, said values comprising subsamples of desired samples, the method comprising the steps of:

addressing said first memory with a first address including a first vector component subaddress and an angle subaddress to produce a first subsample from said first memory;

addressing said first memory with a second address including a second vector component subaddress and a modified subaddress formed as a mathematical function of said angle subaddress to produce a second subsample from said first memory; and utilizing said first and second subsamples in formation of said composite waveform.

9. The method of claim 8 wherein said vector components comprise first and second rectangular components.

10. The method of claim 8 or 9 wherein said modified subaddress formed as a function of said angle subaddress is formed by adding 90° to said angle subaddress.

11. The method of claim 8 or 9 wherein said first and second subsamples, when added together, represent a complete sample of a waveform which is a component of said composite waveform.

* * * * *